(12) United States Patent
Wardell

(10) Patent No.: US 10,305,306 B1
(45) Date of Patent: May 28, 2019

(54) JEWELRY PHONE CHARGING SYSTEMS

(71) Applicant: Krista Wardell, Dallas, TX (US)

(72) Inventor: Krista Wardell, Dallas, TX (US)

( * ) Notice: Subject to any disclaimer, the term of this patent is extended or adjusted under 35 U.S.C. 154(b) by 5 days.

(21) Appl. No.: 15/643,850

(22) Filed: Jul. 7, 2017

Related U.S. Application Data

(63) Continuation-in-part of application No. 15/068,576, filed on Mar. 12, 2016.

(60) Provisional application No. 62/132,828, filed on Mar. 13, 2016.

(51) Int. Cl.
| | |
|---|---|
| *G06F 1/16* | (2006.01) |
| *H02J 7/00* | (2006.01) |
| *A44C 17/02* | (2006.01) |
| *H04M 1/725* | (2006.01) |
| *H02J 7/02* | (2016.01) |

(52) U.S. Cl.
CPC ............ *H02J 7/0054* (2013.01); *A44C 17/02* (2013.01); *G06F 1/1632* (2013.01); *H04M 1/72527* (2013.01); *H01M 2220/30* (2013.01); *H02J 7/022* (2013.01); *H02J 2007/0062* (2013.01)

(58) Field of Classification Search
CPC .. H01M 2/1022; H01M 10/46; H01M 10/488; H01M 2220/30; G01R 31/3606; G06K 19/07732; G10K 5/00; H02J 7/0042; H02J 7/0044; H02J 7/0045; H02J 7/0047; H02J 7/0052; H02J 7/0054; H02J 2007/0062; H04M 1/0254; H04M 1/0262; H04M 1/0283; H04M 1/72527; H01R 31/06; H01R 31/065; H04B 1/3883; H04B 1/3888; G06F 1/1626; G06F 3/03545; G06F 1/1632; A44C 17/0054; H05K 7/2039; F16B 45/02; F16B 45/00; F21L 4/005; F21V 21/08; F21V 33/0052

USPC .................. 455/557, 573; 224/576; 307/18; 320/101, 103, 106, 107, 108, 114, 140; 342/387, 450; 361/679.41, 679.56; 429/96

See application file for complete search history.

(56) References Cited

U.S. PATENT DOCUMENTS

| | | |
|---|---|---|
| 7,612,997 B1 | 11/2009 | Diebel |
| 8,367,235 B2 | 2/2013 | Huang |
| 8,541,985 B1 | 9/2013 | Wong |
| 9,153,985 B1 | 10/2015 | Gjovik |
| 2008/0120817 A1* | 5/2008 | Lin .................... F16B 45/02 24/598.1 |

(Continued)

*Primary Examiner* — Yuwen Pan
*Assistant Examiner* — Paul P Tran
(74) *Attorney, Agent, or Firm* — Arno Naeckel

(57) ABSTRACT

A person worn article is provided that incorporates a jewelry phone charger system. The person worn article comprises a clasp with a first surface, a second surface, and a securing portion, the second surface being different from the first surface. The article further provides a first electrical cable with a first end and a second end, the first end being coupled to one of a universal serial bus (USB) plug and a mobile device male connector, the second end being physically coupled to the first surface of the clasp and a second electrical cable with a first end and a second end, the first end being coupled to the other of the USB plug and the mobile device male connector, the second end being physically coupled the second surface of the clasp, wherein the clasp comprises a 60Hz, 110 volt electric plug with a first prong and a second prong.

17 Claims, 9 Drawing Sheets

(56) References Cited

U.S. PATENT DOCUMENTS

| | | | |
|---|---|---|---|
| 2008/0161023 A1* | 7/2008 | Ko | A44C 15/0015 |
| | | | 455/462 |
| 2009/0179610 A1 | 7/2009 | Lin | |
| 2010/0127856 A1* | 5/2010 | Sipple | G08B 21/24 |
| | | | 340/540 |
| 2012/0087079 A1* | 4/2012 | Ting | G06K 19/07732 |
| | | | 361/679.32 |
| 2012/0212177 A1* | 8/2012 | Peacock | H02J 7/0054 |
| | | | 320/107 |
| 2013/0181661 A1* | 7/2013 | Workman | H02J 7/0042 |
| | | | 320/107 |
| 2014/0054346 A1* | 2/2014 | Ledesma | A45F 3/14 |
| | | | 224/576 |
| 2014/0106611 A1* | 4/2014 | Hardy | H01R 13/7175 |
| | | | 439/577 |
| 2014/0361614 A1 | 12/2014 | Su | |
| 2015/0115870 A1* | 4/2015 | Vance | H02J 7/0042 |
| | | | 320/101 |
| 2016/0183668 A1* | 6/2016 | Grossman | A45F 5/00 |
| | | | 224/576 |
| 2016/0294133 A1* | 10/2016 | Xie | H01R 27/02 |

* cited by examiner

JEWELRY PHONE CHARGING SYSTEMS

CROSS-REFERENCE TO RELATED APPLICATION

This continuation-in-part application is related to and claims priority from co-owned, co-pending utility application Ser. No. 15/068,576, filed Mar. 12, 2016, which in turn claims priority from provisional application Ser. No. 62/132,828, filed Mar 13, 2015, each of which is incorporated herein by reference in their entireties.

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

FIELD OF THE INVENTION

The present subject matter relates generally to the field of mobile device charging systems and more specifically relates to jewelry phone charger systems.

DESCRIPTION OF RELATED ART

Mobile phones and mobile devices have earned the designation of "mobile" because they do not require hard phone and internet lines and they do not need a directly—supplied 110/220 volt AC electrical power source for operation such as may be required to operate a lamp or a refrigerator. Mobile phones and mobile devices contain a rechargeable battery that can be charged and then used when away from a power supply. A typical mobile device charger is actually a power adaptor that provides a power source for the charging circuitry contained within the mobile device. The charger is an AC to DC converter taking an input of 220 volt AC and providing an output voltage around 5 volt DC. Since the universal serial bus specification provides for a 5 volt DC power supply, it is possible to use a universal serial bus cable to connect a mobile device to an AC power supply.

Powerbanks are popular for charging mobile devices while on-the-go. A powerbank is a rechargeable portable device that has a universal serial bus power connector and a mobile device connector. The powerbank is charged using the using universal serial bus power connector and stores energy in its self-contained batteries. When connected with a mobile device, a powerbank discharges its stored power to the mobile device, charging the mobile device battery. Although powerbanks come in a variety of sizes and shapes, they are typically standalone accessories and may not have any other applications. A suitable solution is desired.

Several attempts have been made to solve the above-mentioned problems such as those found in U.S. Pat. and Pub. Nos. 2009/0179610 Lin, 2014/0361614 to Su, 8,541,985 to Wong, 9,153,985 to Gjovik, et. al., 7,612,997 to Diebel, et. al., and 8,367,235 to Huang. This art is representative of mobile device charging systems. However, none of the above inventions and patents, taken either singly or in combination, is seen to describe the invention as claimed.

Preferably, a mobile device charging system should provide an assembly to recharge mobile device housed in a variety of applications and, yet would operate reliably and be manufactured at a modest expense. Thus, a need exists for a reliable jewelry phone charge system to avoid the above-mentioned problems.

BRIEF SUMMARY OF THE INVENTION

In view of the foregoing disadvantages inherent in the known mobile device charging systems art, the present invention provides a novel jewelry phone charger system. The general purpose of the present invention, which will be described subsequently in greater detail is to provide an assembly to recharge mobile device housed in a variety of applications.

A jewelry phone charger system is disclosed herein, in a preferred embodiment, comprising a body which may comprise a first end, a second end, a length, and an attached. The jewelry phone charger assembly may comprise in communicative structural combination the body and the attacher. The body may comprise a hexagonal shape, and may be defined by the first end, the second end, and the length. The first end may comprise a universal serial bus receptacle connector and a cap. The universal serial bus receptacle connector may be useful for mating with a universal serial bus plug. The cap may be removably connectable to and from the body. The cap may comprise a first-cone shape and may comprise a first-inner volume, which may be useful for receiving a universal serial bus receptacle connector.

The second end may comprise a mobile device male connector and a cover. The mobile device male connector may be useful for mating with a mobile device female receptacle. The cover may be removably connectable to and from the body and may comprise a second-cone shape. The second-cone shape may comprise a second-inner volume useful for receiving the mobile device male connector. The length may comprise the receptacle therein. The receptacle encloses the rechargeable battery useful for receiving, storing, and expending an electrical charge. The attacher may comprise the device to removably-couple the body to a person-worn article, which may comprise a jewelry-bail useful for connecting the jewelry phone charger system to the person-worn article. The person-worn article may comprise a necklace. Other articles may be supported as per application.

A person worn article is provided that incorporates a jewelry phone charger system. The person worn article comprises a clasp with a first surface, a second surface, and a securing portion, the second surface being different from the first surface. The article further provides a first electrical cable with a first end and a second end, the first end being coupled to one of a universal serial bus (USB) plug and a mobile device male connector, the second end being physically coupled to the first surface of the clasp and a second electrical cable with a first end and a second end, the first end being coupled to the other of the USB plug and the mobile device male connector, the second end being physically coupled the second surface of the clasp, wherein the clasp comprises a 60 Hz, 110 volt electric plug with a first prong and a second prong.

An alternative person worn article that incorporates a jewelry phone charger system is also presented, the person worn article that comprises a clasp with a first surface, a second surface, and a securing portion, the second surface being different from the first surface. The article further comprises a first cable with a first end and a second end, the second end being physically coupled to the first surface of the clasp and a second cable with a first end and a second end, the second end being physically coupled the second surface of the clasp, wherein one of the first cable and the second cable is an electric cable coupled to one of a universal serial bus (USB) plug and a mobile device male connector.

The jewelry phone charger assembly may be useful for removably-coupling the universal serial bus receptacle connector with the universal serial bus plug, removably-coupling the mobile device male connector with the mobile device female receptacle, powering the rechargeable battery for receiving, storing, and expending the electrical charge, and the body may be removably-coupleable to the person-worn article.

The jewelry phone charger system may further comprise a kit including at least one the jewelry phone charger assembly and a set of user instructions. A method of using a jewelry phone charger system is also disclosed herein may comprise the steps of removing a cap to expose the universal serial bus receptacle, charging a rechargeable battery, donning a jewelry phone charger assembly, removing a cover to expose a mobile device male connector, and charging a mobile device. The method of use may further comprise the step of undonning the jewelry phone charger assembly for storage and alternately for recharge.

The present invention holds significant improvements and serves as a jewelry phone charger system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, jewelry phone charger systems, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a mobile device charging system and more particularly to a jewelry phone charger system as used to improve an assembly to recharge a mobile device housed in a variety of applications.

Figure 1:
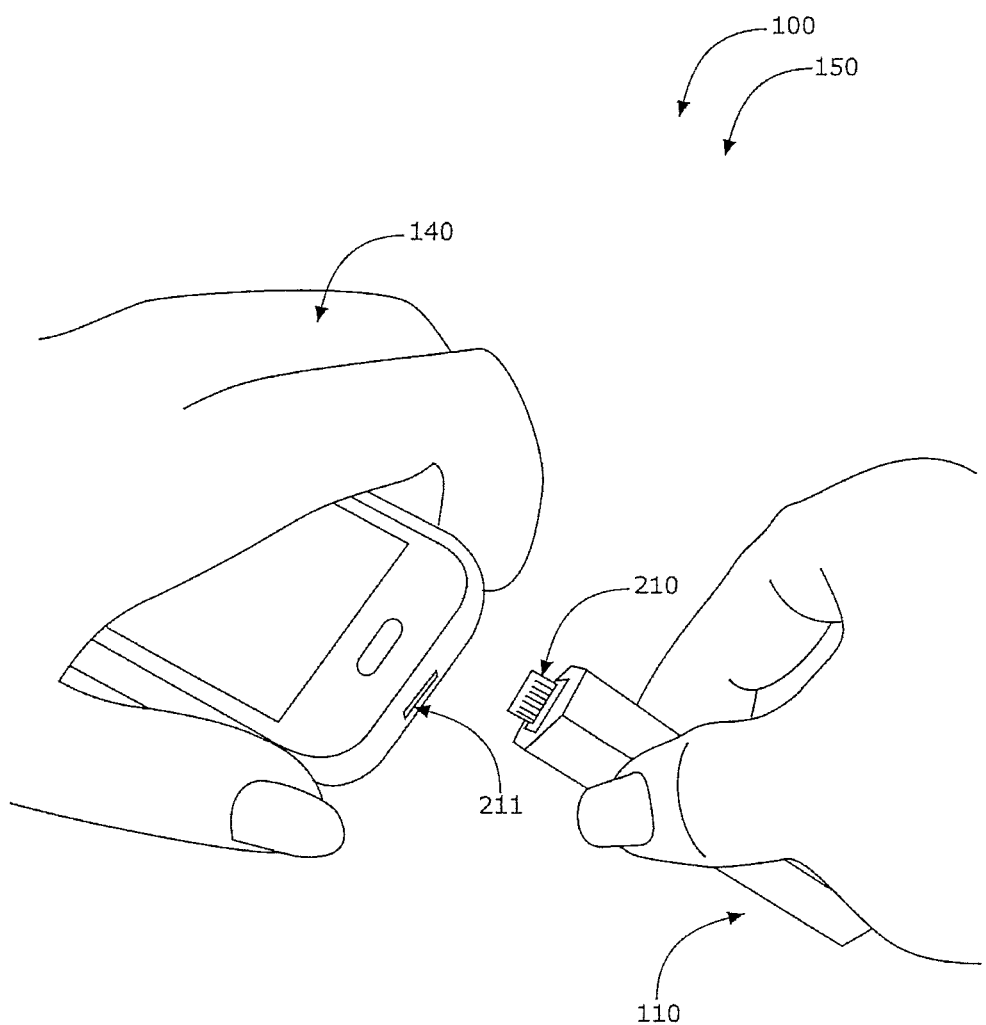
FIG. 1 shows a perspective view illustrating a jewelry phone charger system during an 'in-use' condition showing jewelry phone charger according to an embodiment.

Referring to the drawings by numerals of reference there is shown in FIG. 1, a perspective view showing jewelry phone charger system 100, during an 'in-use' condition 150. Jewelry phone charger system 100 may comprise jewelry phone charger assembly 110. Jewelry phone charger assembly 110 may further comprise mobile device male connector 210, with which wearer-user 140 may removably-couple with mobile device female receptacle 211 to recharge the battery of a mobile device. The mobile device male connector 210 may be a 30-pin phone connecter, micro USB, a 24-pin USB-C, a lightening connector, or any other device connector that currently exists or that may be developed in the future. Upon reading this specification, it should be appreciated that, under appropriate circumstances, considering such issues as user preferences, design preference, structural requirements, marketing preferences, cost, available materials, technological advances, etc., other jewelry phone charger system arrangements such as neckties and bolo ties, magnetic attaches, or international power plug adapters etc., are contemplated herein.

Figure 2:
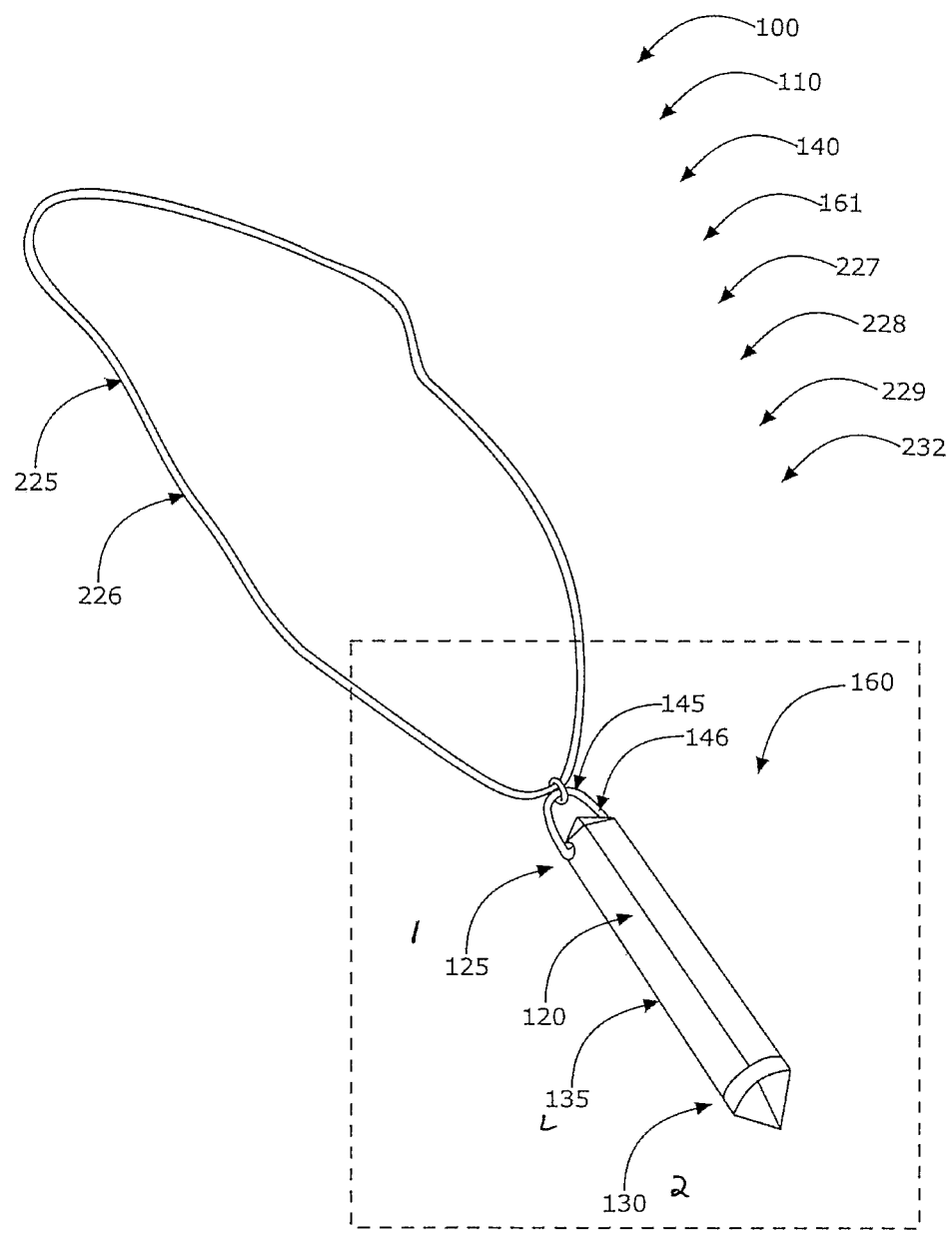
FIG. 2 is a perspective view illustrating the jewelry phone charger system comprising a jewelry phone charger assembly according to an embodiment of FIG. 1.

Referring now to FIG. 2, a perspective view of jewelry phone charger system 100, which may comprise jewelry phone charger assembly 110, which may further comprise body 120. Body 120 may comprise first end 125, second end 130, length 135, and attacher 145. Jewelry phone charger assembly 110 may comprise in communicative structural combination body 120 and attacher 145. Attacher 145 may comprise jewelry-bail 146 useful for connecting jewelry phone charger system 100 to person-worn article 225. Person-worn article 225 may comprise necklace 226 such that it is able to be donned about neck of wearer-user 140.

In continuing to refer to FIG. 2, jewelry phone charger system 100 may comprise alternative embodiments. Person-worn article 225 may comprise brooch 232 such that it is able to be removably attached to clothing of wearer-user 140. Person-worn article 225 may further comprise a belt loop, bracelet, such that it is able to be donned about wrist of wearer-user 140 or purse (by way of providing exemplary means, but not limited to such).

In further referring to FIG. 2, jewelry phone charger system 100 may further comprise kit 160 including at least one the jewelry phone charger assembly 110 and set of user instructions 161. The kit has instructions such that functional relationships are detailed in relation to the structure of the invention (such that the invention can be used, maintained, or the like in a preferred manner). The jewelry phone charger system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different jewelry combinations, parts may be sold separately, etc., may be sufficient.

Figure 3:
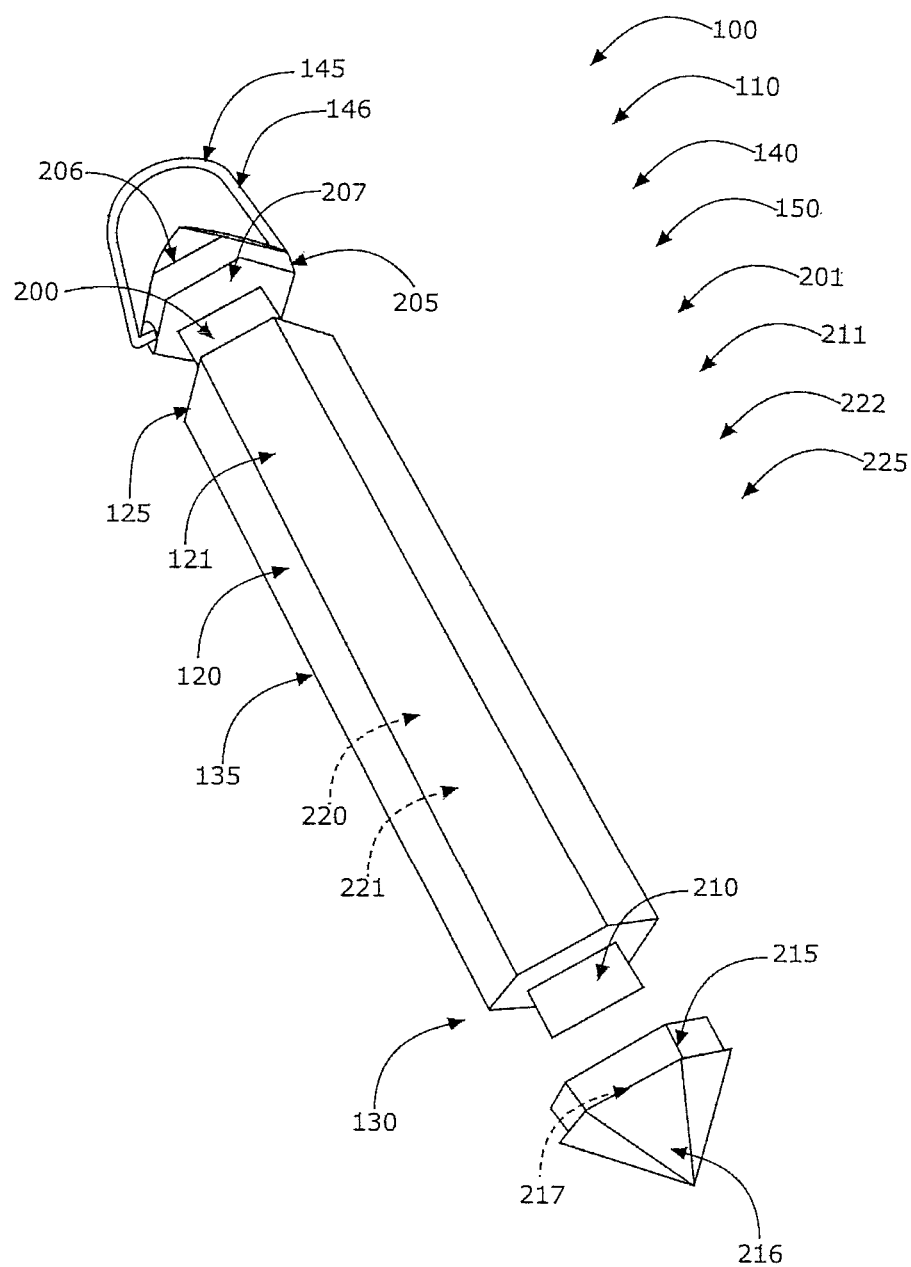
FIG. 3 is an exploded perspective view illustrating the jewelry phone charger assembly according to an embodiment of FIGS. 1-2.

Referring now to FIG. 3, an exploded view of jewelry phone charger system 100, body 120 may comprise hexagonal shape 121 for promoting gripping means for wearer-user 140 during an in-use condition 150. Body 120 may be defined by first end 125, second end 130, and length 135. First end 125 may comprise universal serial bus receptacle connector 200 and a cap 205. Universal serial bus receptacle connector 200 may be useful for mating with universal serial bus plug 201. Cap 205 may be removably connectable to and from body 120. Cap 205 may further comprise first-cone shape 206 and first-inner volume 207, which may be useful for receiving universal serial bus receptacle connector 200. Cap 205 is removably connectable to body 120 such that universal serial bus receptacle connector 200 is protected from impact damage.

In further referring to FIG. 3, second end 130 may comprise mobile device male connector 210 and cover 215. Mobile device male connector 210 may be useful for mating with mobile device female receptacle 211. Cover 215 may be removably connectable to and from body 120 and may further comprise second-cone shape 216. Second-cone shape 216 may comprise second-inner volume 217, useful for receiving mobile device male connector 210. Second-cone shape 216 is useful for protecting mobile device male connector 210 from impact damage. Cover 215 is removably connectable to body 120 such that mobile device male connector 210 is able to be accessible upon demand. Length 135 may comprise receptacle 220 therein. Receptacle 220 encloses rechargeable battery 221 useful for receiving, storing, and expending an electrical charge 222. Attacher 145 may removably-couple body 120 to person-worn article 225. Attacher 145 may further which may comprise jewelry-bail 146 useful for connecting jewelry phone charger system 100 to person-worn article 225.

In continuing to refer to FIG. 3, jewelry phone charger assembly 110 may be useful for removably-coupling universal serial bus receptacle connector 200 with universal serial bus plug 201; removably-coupling mobile device male connector 210 with mobile device female receptacle 211; powering rechargeable battery 221 for receiving, storing, and expending electrical charge 222; and body 120 may be removably-coupleable to attacher 145 and person-worn article 225.

Figure 4:
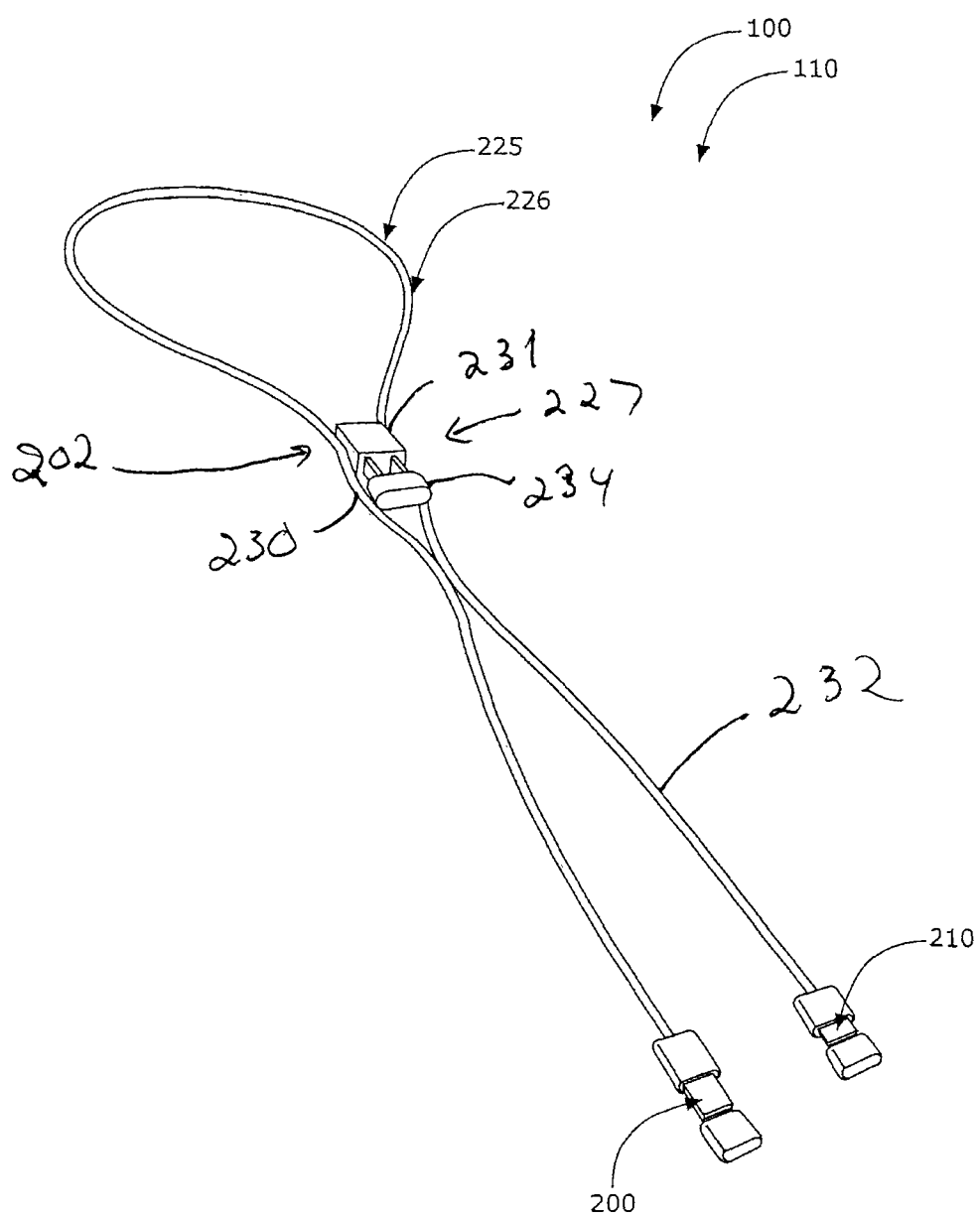
FIG. 4 is a perspective view illustrating the jewelry phone charger assembly according to an alternative embodiment of FIGS. 1-3.

Referring now to FIG. 4, an alternative embodiment of jewelry phone charger system 100 which may comprise person-worn article 225 is depicted. Person-worn article 225 may comprise a necklace 226 such that it is able to be donned about neck of a wearer-user 140. Person worn article 225 may comprise universal serial bus receptacle connector 200 and mobile device male connector 210. Person worn article 225 may further comprise a clasp 227 that may comprise a cap 235 and a 110 volt, 60 hertz power plug 231 that may be inserted into 110 volt, 60 hertz power outlet. The universal serial bus receptacle connector 200, and/or a mobile device male connector 210 may be connected to the 110 volt, 60 hertz power plug 231 in series or in parallel by electrical cables 230 and 232, respectively. Mobile device male connector 210 may be coupled with mobile device female receptacle 211 such that a mobile device (See, FIG. 1) may be supplied with electrical current for charging.

Figure 5:
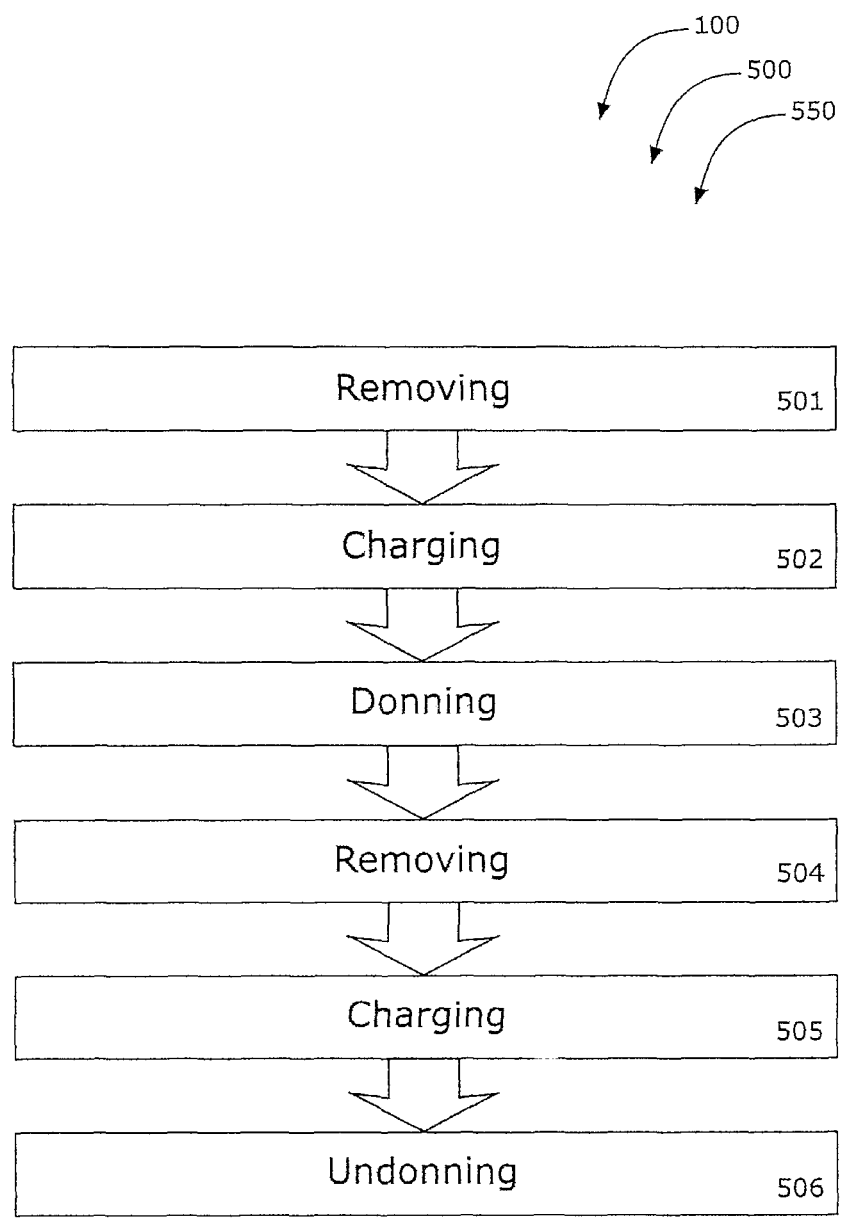
FIG. 5 is a flowchart illustrating a method of use for the jewelry phone charger system according to an embodiment of FIGS. 1-4.

Referring now to FIG. 5 showing flowchart 550 illustrating method of use 500 for jewelry phone charger system 100 according to an embodiment of the present invention of FIGS. 1-4. As shown, method of use 500 may comprise the steps of: step one 501, removing cap 205 to expose universal serial bus receptacle connector 200; step two 502, charging rechargeable battery 221; step three 503, donning jewelry phone charger system 100; step four 504, removing cover 215 to expose mobile device male connector 210 to insert in to mobile device female receptacle 211; and step five 505, charging mobile device 101. The method of use may further comprise step six 506, undonning jewelry phone charger system 110 for storage and, alternately, for recharge.

Figure 6:
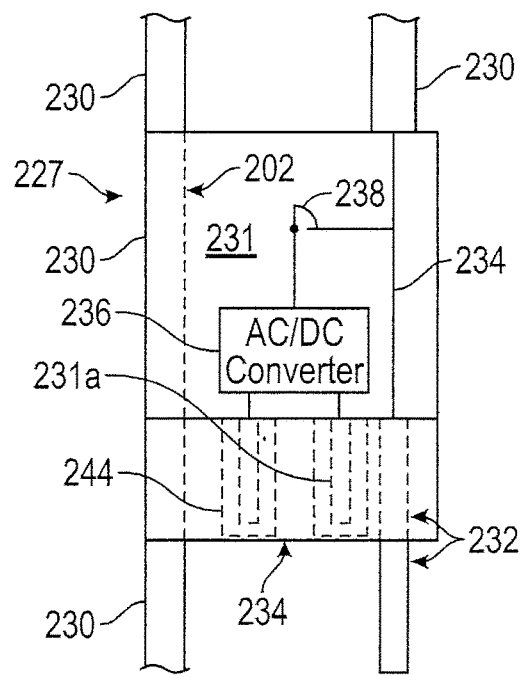
FIG. 6 is a non-limiting, exemplary functional diagram of a phone charger system clasp according to an embodiment such as depicted in FIG. 4.

Referring now to FIG. 6 depicting an exemplary, non-limiting clasp/slide 227 that may comprise person-worn article 225. Clasp 227 includes a 110v, 60 Hz plug 231, with dual prongs 231A that are inserted into a conventional wall socket. Each prong 231A is connected to an AC-to-DC power converter 236 as is well known in the art.

The AC/DC power converter 236 may be any suitable power converter known in the art or that may be developed in the future. Such AC/DC power converters 236 are ubiquitous and may have many different designs and features. An exemplary, non-limiting AC/DC power converter converts a 110v, 60 Hz power input to a DC voltage and current output that is compatible with both of a USB chargeable device or the personal communication device being charged, such as 5v DC and 0.75 Amps. An exemplary, non-limiting AC/DC converter may include a step down transformer for reducing 110v AC power to much lower voltage (e.g., 10 v AC) that is coupled in series with a rectifier to produce a DC voltage (e.g., 5v DC) followed by a filter to remove any voltage ripple remaining from the rectifier. The DC voltage may be subjected to a voltage regulator before being supplied to a load such as a cell phone or a USB connected device (See, FIG. 1).

The AC/DC power converter 236 provides a DC voltage and current to one or more switches 238 or a switch fabric. A Switch fabric or switching fabric is a network topology in which components interconnect via one or more network switches.

Switch 238 may be any suitable switch known in the art or that may be developed in the future. As a non-limiting example, switch 238 may be a manual toggle switch located and manipulated on the surface of the clasp 227. Alternatively switch 238 may be an automatic relay switch that is closed when an 110v AC power is sensed by the AC/DC converter 236 and that is normally open when there is none. Switch 238 is connected to conductor 234, which is in turn connected to both of the USB connector 200 via cable 230 and the mobile device male connector 210 via cable 232. Cables 230 and 232 may comprise two wires (e.g., 5v and ground—not shown) and be capable of carrying a suitable current. That current may range up to approximately 2 amps or more.

When the switch 238 is open, no DC power is provided to conductor 234 from the AC/DC converter 236. In this "open" mode a device connected to the USB connecter 200 may charge a device connected to the mobile device male connector 210, and vice versa. Alternatively, when the switch 238 is in the closed position, DC power is provided to the conductor 234 from the AC/DC converter 236 that may charge the devices connected to one or both of the USB connector 200 and the mobile device male connector 210.

In addition to housing charging circuitry, clasp 227 is a physical necklace slide or clasp that may be stylized. The USB cable 230 in conjunction with the mobile device cable 232 comprise the necklace 226. A cable 230/232 may be fixedly attached to the clasp 227 at a first location of the clasp and detachably or slideably attached to a second, or a securing, portion of the clasp. The second portion may be a groove 202 constructed into and along at least a portion of a side of the slide 227 or, in the alternative may be a fastening device (not shown), such as a spring clip or a friction clip, mounted on the exterior of the clasp 227 and or on cap 235. The clip may be any suitable clip known in the art or that may be developed in the future.

Figure 7:
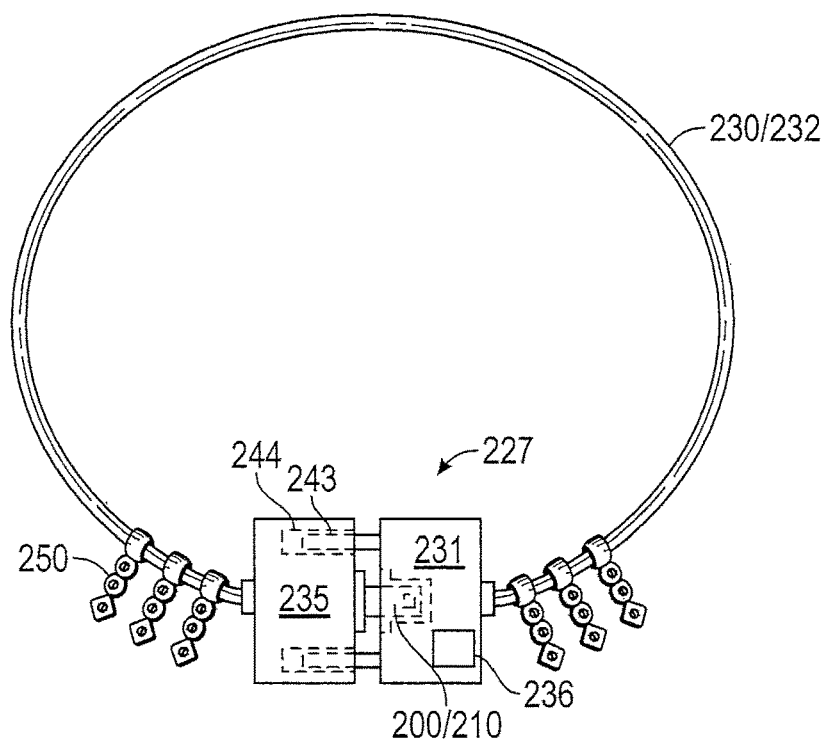
FIG. 7 is a depiction of an alternative embodiment of jewelry phone charger system.

Referring now to FIG. 7, an alternative embodiment of jewelry phone charger system 100 is depicted that may also comprise person-worn article 225 with a clasp 227 that includes AC/AD converter 236. The embodiment of FIG. 7 includes plug 231 with prongs 231A and cap 235 with cavities 244 to accommodate the prongs when the prongs are inserted into cap. The plug 231 and the cap 235 are physically and electrically connected to USB/device cable 230/232. The clasp 227 may be stylized and decorative ornaments 250 may be attached to the clasp 227 and/or the USB/device cable 230/232 (See also FIGS. 9-10) to complete the jewelry phone charger system 100.

Figure 8:
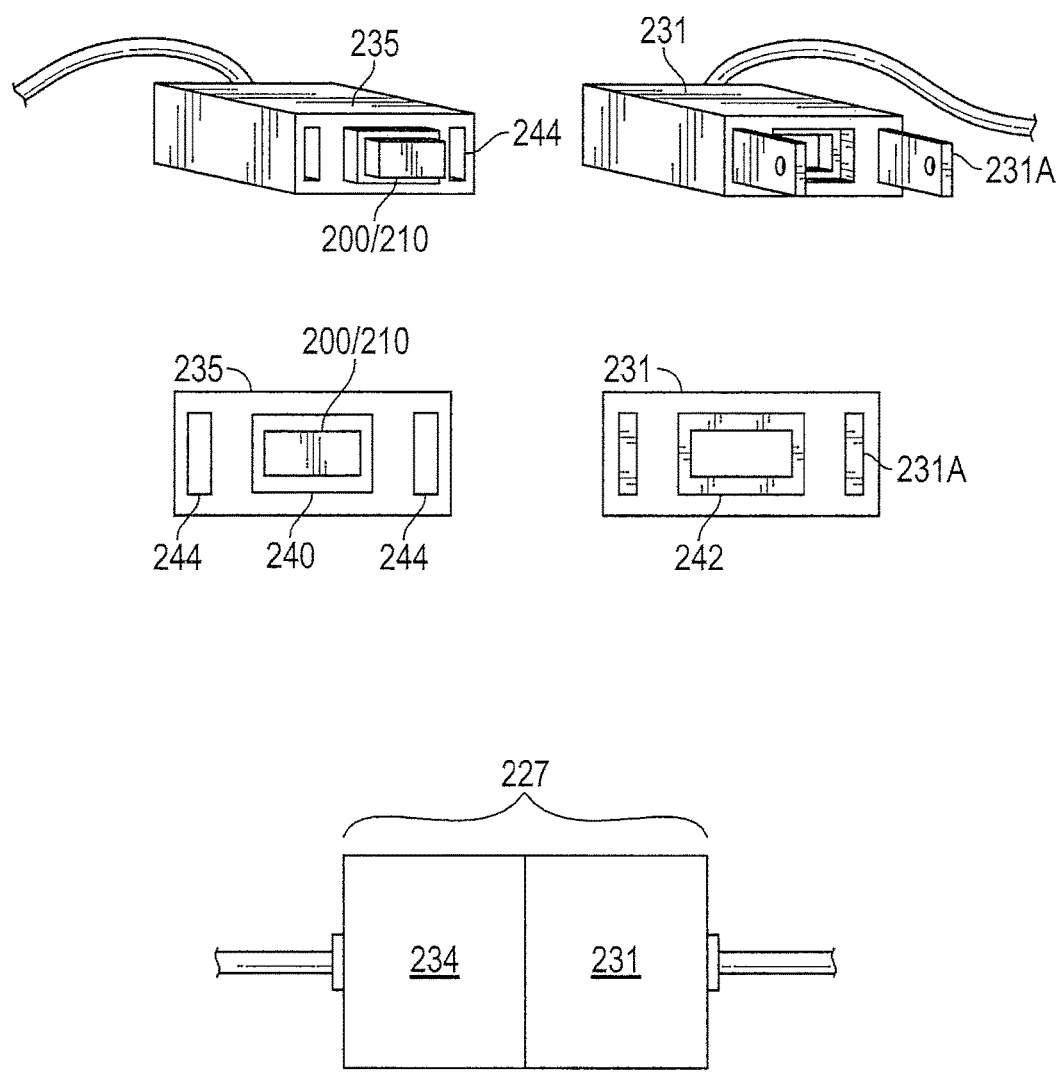
FIG. 8 is a perspective view of an exemplary alternative clasp as may be applied to the embodiments.

Referring to FIG. 8 is a perspective view of an exemplary alternative clasp 227, comprising an exemplary plug 231 and exemplary cap 235. Clasp 227 may contain any or all of the circuitry described above in regard to FIG. 6. When functioning as a necklace, the prongs 231A of plug 227 frictionally engage cavities 244 of the cap 235. It should be noted that other arrangements for the plug and cap may be created with functionally equivalent components without departing from the scope and spirit of this disclosure.

Alternatively or additively, magnets 240/242 may be embedded into the opposing faces of plug 231 and or cap 235 to effectuate or to augment the frictional engagement of the prongs 231A into cap 235. The magnets 240/242 may circumscribe the USB connector 200 or the mobile device male connector 210, as shown. Or, magnets 240/242 may be inlaid at other opposing locations on the opposing surfaces of cap 235 and plug 231. Opposing magnets 240 and 242 may be of opposing polarities such that they attract.

Figure 9:
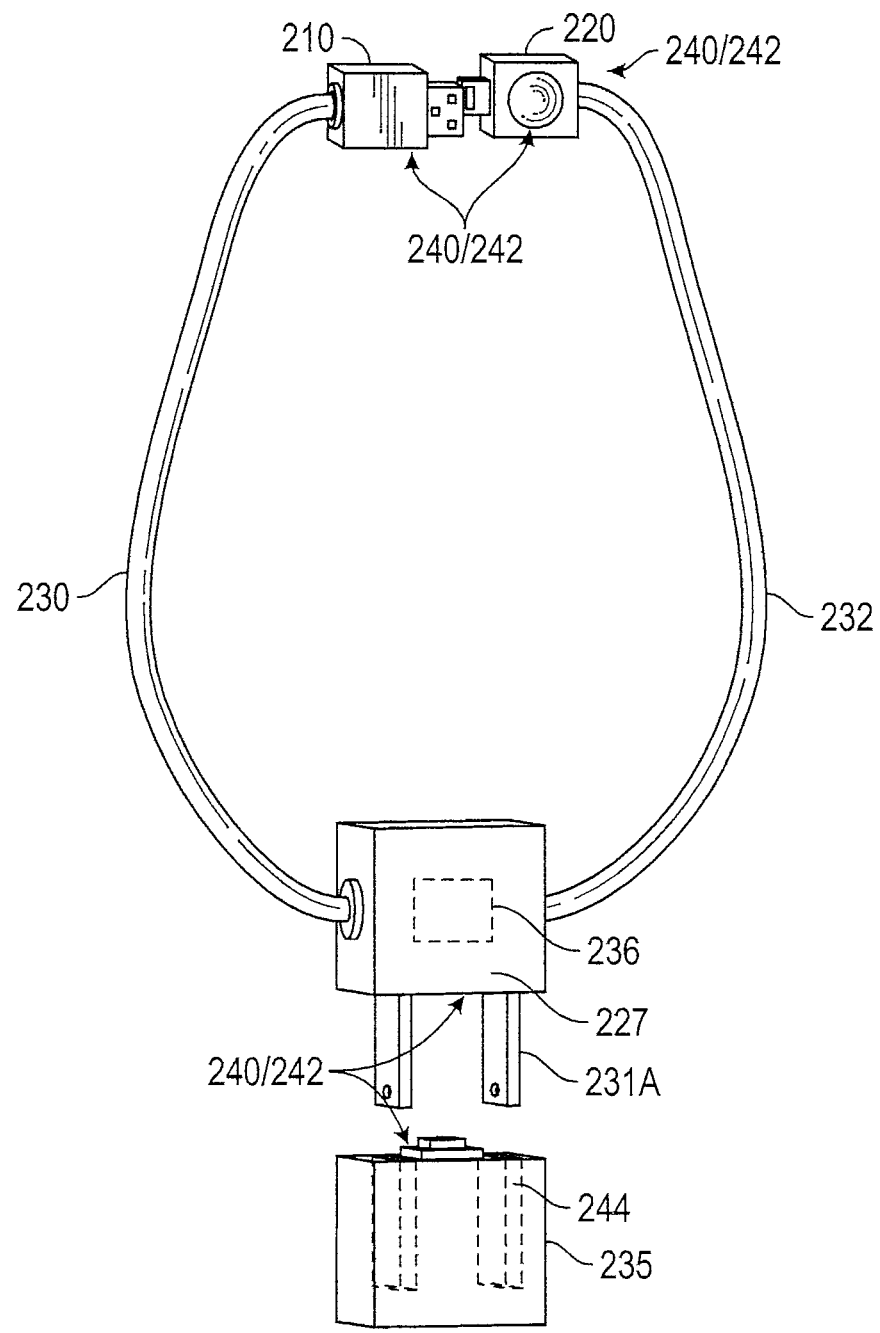
FIG. 9 is an alternative functional embodiment of the jewelry phone charger system.

FIG. 9 depicts an alternative functional embodiment for the necklace 226 that includes clasp 227 acting as a decorative pendant that includes the AC/DC converter 236 and a cap 235. AC/DC converter 236 may also include switch(es) 238 that is arranged and operates in a similar manner to that discussed in FIG. 6. As described above, cap 235 may be frictionally attached to prongs 231A of plug 231 and/or may include magnets 240/242. In addition, USB plug 200 and mobile device male connector 210 may be attached together by other opposing magnets 240/242 or they may be attached together via a mutual intermediary connector (not shown) that frictionally receives both the USB plug 200 and the mobile device male connector 210. The necklace 226 may also include fashion jewelry 250 that may be physically and electrically attached to the power cables 230/232 and/or clasp 227 at various locations.

Figure 10:
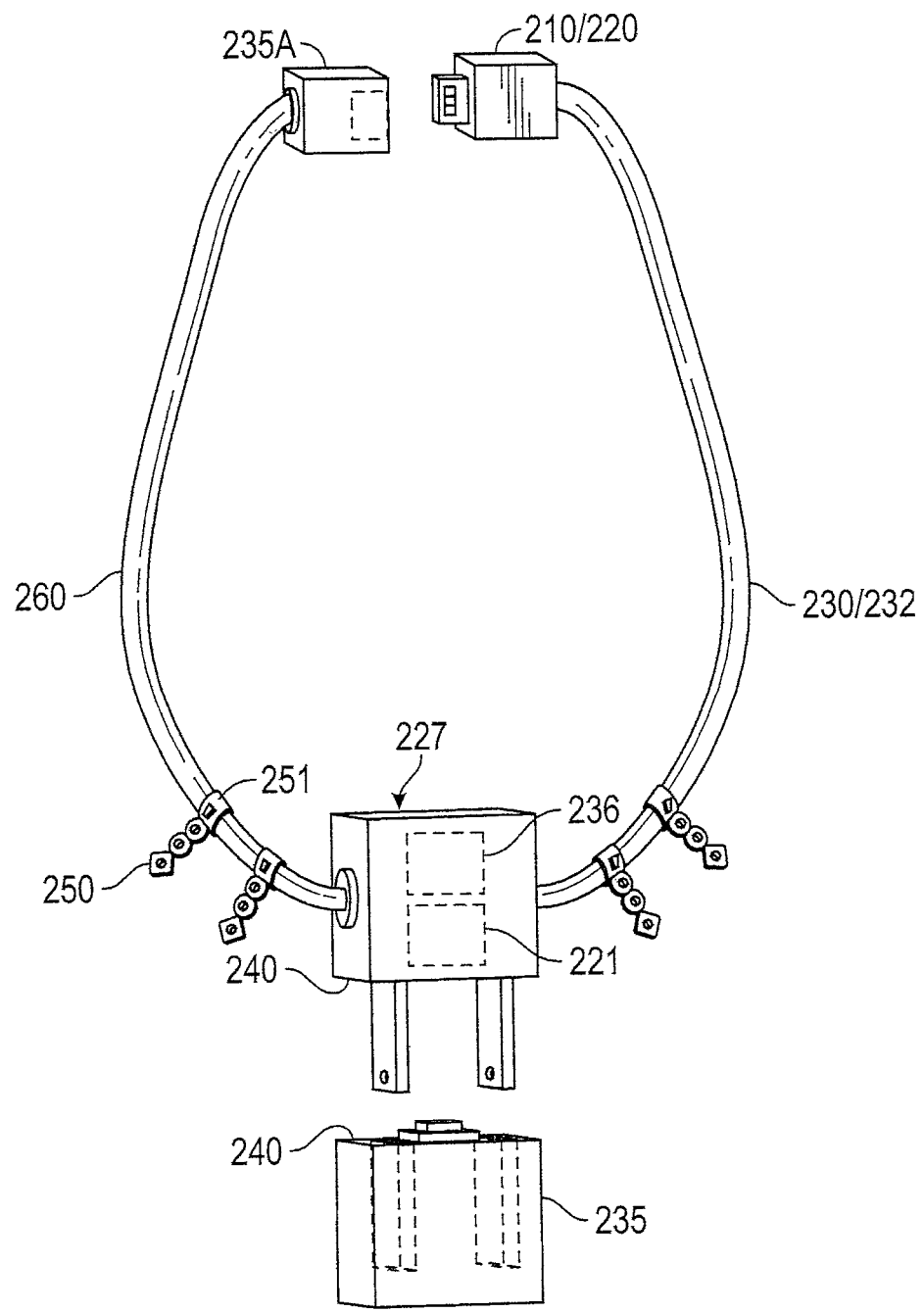
FIG. 10 is an alternative functional embodiment of the jewelry phone charger system.

FIG. 10 depicts an alternative functional embodiment for the necklace 226 that includes clasp 227 acting as a decorative pendant that includes the AC/DC converter 236 (See, FIG. 6) and a cap 235. As described above, cap 235 may be frictionally attached to prongs 231A of plug 231 and/or may include magnets 240/242. One of a USB plug 200 and a mobile device male connector 210 may be attached to electric cable 230/232. A non-electrifiable cable 260 constitutes a companion cable with a second cap 235A that frictionally or magnetically receives the USB plug 200 or the mobile device male connector 210. The cap 235A may also may couple to the either of the USB plug 200 or the mobile device male connector 210 using a pair of opposite polarity magnets set within or coplanar with the surface of the cap 235A and plugs 200/210 (See, e.g., FIG. 8). Cables 260 and 230/232 and clasp 227 may also be adorned with fashion jewelry 250 that is attached to the cables (260, 230/232) at various locations.

As discussed in regard to the clasp 227 depicted in FIGS. 6 and 8-10, clasp 227 may also contain a rechargeable battery 221 as disclosed and discussed in regard to FIGS. 1-3. Similarly, any of the fashion jewelry 250 may also contain, or be, a rechargeable battery 221. The rechargeable battery 221, regardless of mounting location, may be coupled to connector 234 so that when switch 238 is shut, battery 221 receives power and when switch 238 is open the battery delivers power to USB plug 200 and/or a mobile device male connector 210.

Similarly, clasp 227 may contain a capacitor (not shown) in electric communication with the battery 227, switch 238, AC/DC converter 236 and/or cables 230/232. The capacitor may be connected in parallel or in series with switch 238 such that when switch 238 is shut, energy contained therein is transferred to conductor 234 for charging a device. Once informed of the presence and purpose of the capacitor, a skilled artisan may conceive multiple ways of integrating the capacitor into the circuitry of clasp 227, which may include additional intervening and supporting components such as diodes and resistors.

Further, in regard to the fashion jewelry 250 on or depending from, clasp 227 and/or cable 230 or 232, one or more of the depending ornaments of fashion jewelry 250 may comprise one or more light emitting diodes (LED) 251. The one or more LED(s) 251 may be electronically connected to USB plug 200 and/or to mobile device male connector 210 such that when power is applied to one or both of USB plug 200 and mobile device male connector 210, a respective LED(s) would light indicating a positive connection. The LED(s) 251 may also be electronically connected to a voltage detector circuit, a voltmeter and/or an ammeter (not shown) incorporated into necklace 226 via any suitable static or programmable logic device (not shown) that may currently exist or that may be developed in the future. As such, a combination of the one or more LED(s) 251 may indicate a level of charge of a battery either by changing color of an emitted light or by changing the number and/or location of the lighted LED(s). Those of ordinary skill in the art would recognize that there is a multitude of physical and circuit arrangements that may electrically and logically connect the LED(s) 251, switch 234 and the other electrical components discussed above to produce one or more indicator light systems, although not all may be obvious to a skilled artisan without reference to the disclosure infra.

The LEDs may be any type of LED currently known or that may be in the future. Non-limiting examples include organic LEDs, quantum dot LEDs, single color LEDs, white LEDs, and multi-color LEDs. Any particular LED may be electronically connected to the components of the embodiments described herein to produce an illumination regardless of its physical location, including the use of the pendent described in FIGS. 1-3, supra, that may be incorporated as a piece of fashion jewelry 250.

It should be noted that the steps described in the method of use can be carried out in many different orders according to user preference. The use of "step of" should not be interpreted as "step for", in the claims herein and is not intended to invoke the provisions of 35 U.S.C. § 112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The foregoing detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Those of skill in the art will appreciate that the various illustrative logical blocks, modules, circuits, engines and algorithm steps described in connection with the embodiments disclosed herein may be implemented as electronic hardware, computer software, firmware or combinations of thereof. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. A processor and any storage device are also considered herein to be non-limiting examples of computer readable media.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connected" or "coupled to" used in describing a relationship between different elements do not imply that a direct physical connection must be made between these elements unless so stated. For example, two elements may be connected to each other physically, electronically, logically, or in any other manner, through one or more additional elements.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A person worn article that incorporates a jewelry phone charger system, the person worn article comprising:
   a clasp with a first surface, a second surface, and a securing portion, the second surface being different from the first surface;
   a first electrical cable with a first end and a second end, the first end being coupled to one of a universal serial bus (USB) plug and a mobile device male connector and the second end being physically coupled to the first surface of the clasp; and a second electrical cable with a first end and a second end, the first end being coupled to the other of the USB plug and the mobile device male connector and the second end being physically coupled the second surface of the clasp, wherein the clasp comprises 60 Hz, 110 volt electric plug with a first prong and a second prong.

2. The person worn article of claim 1, wherein one of the first cable and the second cable is also adjustably connected to the securing portion of the clasp at a point along its length other than the first end or the second end thereby forming a loop that is closed by the clasp.

3. The person worn article of claim 1, further comprising a cap with at least two cavities, wherein the at least two cavities frictionally secure the cap to the first prong and the second prong.

4. The person worn article of claim 3, wherein the clasp incorporates an alternating current-to-direct current (AC/DC) converter circuit with an input and an output, the input being electrically connected between the first prong and the second prong.

5. The person worn article of claim 4, wherein the clasp further includes a conductor electrically connected to the output of the AC/DC converter circuit and electrically connected to the second end of each of the first electrical cable and the second electrical cable.

6. The person worn article of claim 5, wherein the conductor includes a switch that connects and disconnects the AC/DC converter output to the second ends of the first and second electric cables.

7. The person worn article of claim 4, wherein the clasp incudes a rechargeable battery coupled to the AC/DC converter output.

8. The person worn article of claim 3, wherein the cap comprises a magnet of a first polarity and the clasp comprises a magnet of a second polarity that are configured to magnetically connect to the cap to the clasp.

9. The person worn article of claim 1, wherein the USB plug comprises a magnet of a first polarity and the mobile device male connector comprises a magnet of a second polarity that are configured to magnetically connect to the USB plug to the mobile device male connector.

10. The person worn article of claim 1, wherein the clasp further comprises a logic circuit electronically coupled to at least one of the first and the second electronic cables.

11. The person worn article of claim 1 further comprising at least one fashion jewel.

12. The person worn article of claim 10 further comprising at least one fashion jewel.

13. The person worn article of claim 10, wherein the at least one fashion jewel comprises one or more light emitting diodes (LED).

14. The person worn article of claim 13, wherein the logic circuit is configured to sense the charging level of a battery powered device removably attached to one or both of the USB plug and the mobile device male connector.

15. The person worn article of claim 13, wherein the clasp further comprises a voltmeter electronically coupled to the logic circuit.

16. The person worn article of claim 13, wherein the logic circuit is electronically coupled to a voltage detector circuit that is configured to detect the connection of the clasp to a battery powered device.

17. The person worn article of claim 14, wherein the logic device is further configured to turn on and off the one or more LEDs as an indication of the voltage level detected at the one or both of the USB plug and the mobile device male connector.

* * * * *